(No Model.) 2 Sheets—Sheet 1.

A. CAMERON.
FRICTION LOCK OR CLUTCH FOR FLY WHEELS OF FEED CUTTERS.

No. 449,612. Patented Mar. 31, 1891.

Witnesses
F. E. Kennedy
R. Redlick

Inventor
Arthur Cameron
By Chas. G. Page
Attorney (No Model.) 2 Sheets—Sheet 2.
A. CAMERON.
FRICTION LOCK OR CLUTCH FOR FLY WHEELS OF FEED CUTTERS.
No. 449,612. Patented Mar. 31, 1891.
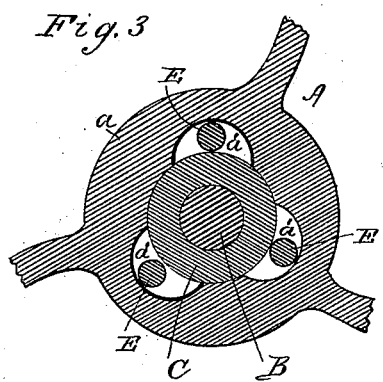
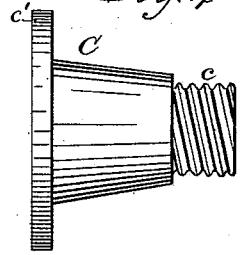
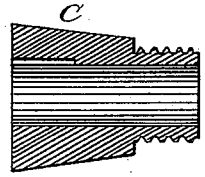
Witnesses
H. C. Kennedy
R. Redlick
Inventor
Arthur Cameron
By Chas. G. Page
Attorney

UNITED STATES PATENT OFFICE.

ARTHUR CAMERON, OF CHICAGO, ILLINOIS, ASSIGNOR, BY MESNE ASSIGNMENTS, TO ANNA B. AUSTIN, OF SAME PLACE.

FRICTION LOCK OR CLUTCH FOR FLY-WHEELS OF FEED-CUTTERS.

SPECIFICATION forming part of Letters Patent No. 449,612, dated March 31, 1891.

Application filed June 12, 1890. Serial No. 355,267. (No model.)

*To all whom it may concern:*

Be it known that I, ARTHUR CAMERON, a citizen of the United States, residing at Chicago, in the county of Cook, State of Illinois, have invented a certain new and useful Improvement in Friction Locks or Clutches for Fly-Wheels of Feed-Cutters, of which the following is a specification.

My invention relates to friction locks or clutches adapted for fly-wheels in feed-cutters, and of that kind in which the fly-wheel is held upon its shaft by a friction-lock which, while establishing rigid connection between the fly-wheel and shaft under all ordinary circumstances, will nevertheless permit the fly-wheel to turn by reason of its acquired momentum independently of the shaft should the latter be suddenly arrested either entirely or partially.

The object of my invention is to provide a simple and efficient lock or clutch adapted to permit the wheel to turn independently of the shaft under circumstances hereinbefore last mentioned, but serving to automatically re-establish driving connection between the shaft and wheel as soon as the necessity for an independent motion of the wheel ceases to exist, to insure proper driving connection between the shaft and wheel at proper times and yet render the disconnection of such driving connection when necessary a matter of certainty, to avoid a multiplicity of parts, to provide an economical, strong, and durable construction, and to provide certain details serving to increase the general efficiency of friction-locks for fly-wheels in feed-cutters.

To the attainment of the foregoing and other useful ends my invention consists in matters hereinafter set forth, and particularly pointed out in the claims.

Figure 1:
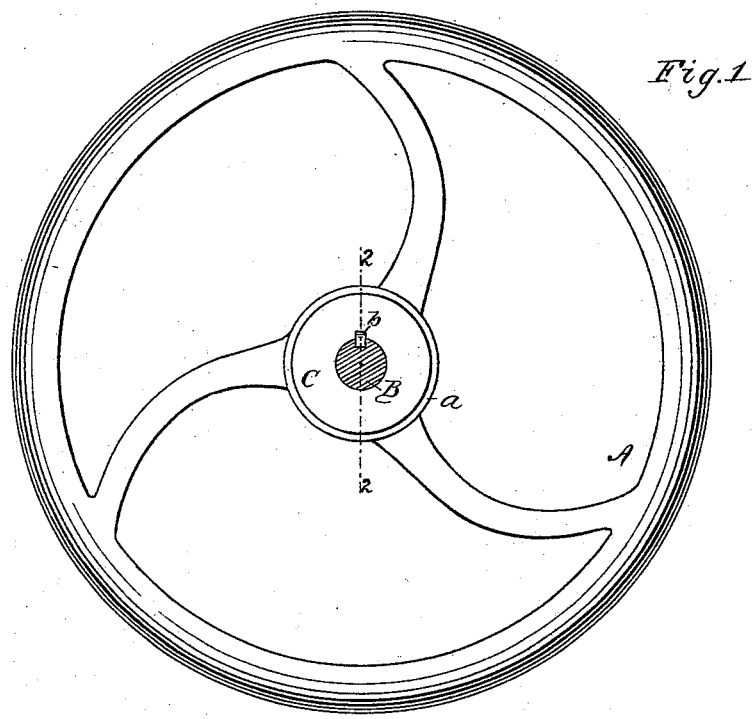
Figure 2:
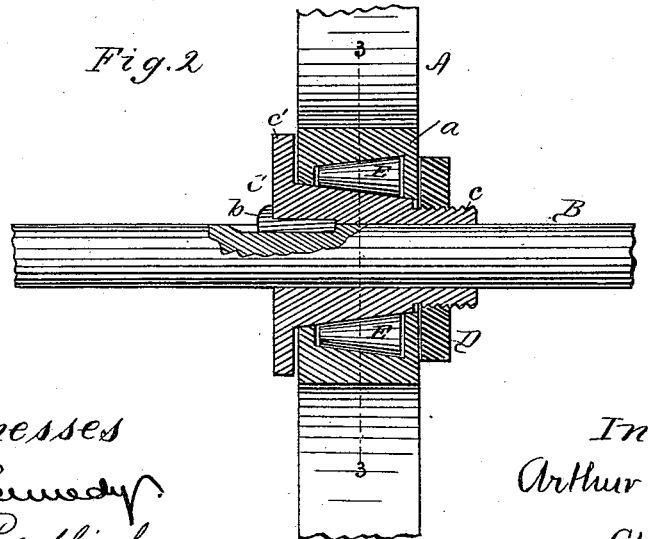

In the accompanying drawings, Figure 1 represents in elevation a fly-wheel with a friction-lock embodying my invention, the shaft being shown in cross-section. Fig. 2 represents on a larger scale a section on line 2 2 in Fig. 1, a portion only, however, of the shaft being in section. In this view the outer portion of the wheel is, for convenience of illustration, broken away. Fig. 3 is a section on line 3 3 in Fig. 2. Fig. 4 is a side view of the conical sleeve. Fig. 5 is a longitudinal section of the conical sleeve with the flange $c'$, shown in Fig. 4, omitted. Fig. 6 represents one of the conical rolls.

In said drawings, A indicates the fly-wheel, and B denotes the rotary shaft, upon which the fly-wheel is to be so held that under ordinary circumstances it will be locked upon the shaft, but nevertheless be permitted to continue its motion independently of the shaft should the latter be suddenly arrested by reason of the opposition to the action of the knives or cutters of some unusual obstruction. The sleeve is held in rigid connection with the shaft by some suitably-arranged key—as, for example, by a key $b$, as herein shown—by which arrangement the sleeve can be made separate from the shaft, and thereby avoid the expense and other disadvantages incident to the employment of a shaft formed with a conical bearing portion. The sleeve C is externally conical or cone-shaped for a portion of its length and has its end portion beyond the smaller end of its conical portion threaded, as at $c$, so as to receive an adjusting-nut D.

The hub $a$ of the fly-wheel is provided with a conical bore adapted to receive the conical portion of the sleeve, which latter may be provided at its larger end with an annular flange $c'$, arranged to lie opposite one end of the fly-wheel hub, as in Figs. 2 and 4, or such flange can be dispensed with, as illustrated in Fig. 5. I prefer, however, to employ the said flange, since it forms a dust-guard at one end of the fly-wheel hub, it being here observed that the nut D forms a like guard at the opposite end of said hub.

The hub of the fly-wheel is provided with a set of separately-arranged concavities or pockets $a'$, adapted to receive the cone-shaped rolls E, which are arranged about and upon the conical or tapered body portion of the sleeve C or other conical or analogous tapered or wedge-shaped bearing-surface on the shaft. These pockets are tapered longitudinally in conformity with the rolls E, which latter are formed as truncated cones, the pockets being preferably but not necessarily somewhat longer than the rolls. By such arrangement the rolls serve as conical wedges applied between the sleeve and the walls of the pockets. The pockets are, however, made somewhat wider than the diameters of the conical rolls, as illustrated in Fig. 3, a simple explanation of such arrangement being that each pocket is shaped longitudinally from a hollow truncated cone somewhat larger than any one of the conical rolls E, so that in section transverse to the axis of the shaft the curvature of the wall of each pocket is on the arc of a circle or proximate circle having its center eccentric to the axis of the roll in the pocket and somewhat nearer the shaft, it being observed that peripheral portions of the conical sleeve are to some extent received within the pockets, and hence that while the rolls do not fill the pockets each roll will at diametrically-opposite points or lines extending from end to end have its bearings respectively on the sleeve and against the fly-wheel hub. By such arrangement the nut D, which is arranged upon the threaded end of the sleeve and against an end of the fly-wheel hub, can be tightened up so as to adjust and wedge the fly-wheel hub on the conical sleeve, and also wedge the conical rolls between said hub and sleeve in a way to tighten up the parts sufficiently to hold the fly-wheel rigid on the sleeve under all ordinary circumstances. Should, however, the shaft be arrested during its operation, the momentum of the fly-wheel will cause it to turn independently of the sleeve.

By operating nut D the hub of the fly-wheel can, as aforesaid, be adjusted upon the conical or tapered bearing on the shaft, so as to cause the conical or tapered rolls to wedge between said bearing on the shaft and the walls of the pockets to a degree sufficient to hold the fly-wheel in rigid connection with the shaft under all ordinary circumstances. Should, however, a resistance be suddenly opposed to the operation of the rotating shaft, so as to arrest it or unduly retard its action, the momentum of the fly-wheel will be sufficient to overcome the lock formed by the tapered rolls wedged between the hub and bearing on the shaft, and hence the fly-wheel will continue to revolve until arrested by inertia, or until its speed is decreased by inertia to the rate of speed of the retarded shaft. When the fly-wheel thus automatically unlocks from the shaft, the tapered rolls turn about their respective axes, and hence permit the desired independent rotation of the fly-wheel. This action on the part of the rolls is due to the transverse curvature or part-circular form of the walls of the pockets, which correspond with the transverse circular form of the rolls to an extent to allow the rolls to revolve about their respective axes when the shaft is suddenly stopped and the lock overcome by the momentum of the fly-wheel. It will also be understood that the wheel provided with a conical or tapered bore fitted to a like bearing-surface on the shaft and having recesses tapered reversely to the taper of said bearing-surface, and wedges of various forms arranged within said recesses, is herein regarded as a feature of novelty, although as a special and important feature of improvement I prefer as a special form of wedge the conical roll herein shown.

What I claim as my invention is—

1. The combination, substantially as hereinbefore set forth, of the fly-wheel arranged upon a conical bearing on the shaft and provided with a set of pockets and a set of cone-shaped rolls arranged about the conical bearing on the shaft and confined within said pockets in the fly-wheel, for the purpose set forth.

2. The combination, substantially as hereinbefore set forth, of the fly-wheel arranged upon a conical bearing on the shaft and provided with a set of pockets, a set of cone-shaped rolls arranged about said conical bearing and confined within said pockets, and a nut fitted upon a threaded bearing on the shaft and arranged for adjusting the fly-wheel upon its conical bearing.

3. The combination, substantially as hereinbefore set forth, of the conical sleeve threaded at one end and keyed upon a shaft, the fly-wheel arranged upon the conical sleeve, and a set of cone-shaped rolls which are contained within the hub of the fly-wheel and arranged to bear upon the conical surface of the sleeve.

4. The combination, substantially as hereinbefore set forth, of the shaft provided with a conical bearing for the fly-wheel, the fly-wheel having a conical bore fitted to said bearing and provided with laterally-arranged recesses tapered reverse to the taper of the conical bearing, and wedges arranged within said tapered recesses.

5. The combination, with the shaft, of the conical sleeve C, flanged at its larger end and threaded at its smaller end, the fly-wheel containing a set of conical rolls E bearing upon the conical sleeve, and a nut D, fitted upon the threaded portion of said sleeve, the fly-wheel being arranged upon the conical sleeve and confined between the flange c of the sleeve and the nut D, substantially as and for the purpose set forth.

ARTHUR CAMERON.

Witnesses:
HARRY C. KENNEDY,
ROSA REDLICK.